(12) United States Patent  
Yamagoshi

(10) Patent No.: US 7,096,476 B2
(45) Date of Patent: Aug. 22, 2006

(54) DISK TABLE ROTATION SUPPORTING STRUCTURE

(75) Inventor: Yasushi Yamagoshi, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 369 days.

(21) Appl. No.: 10/680,166

(22) Filed: Oct. 8, 2003

(65) Prior Publication Data

US 2004/0071051 A1    Apr. 15, 2004

(30) Foreign Application Priority Data

Oct. 8, 2002    (JP)    ............................ P2002-294954

(51) Int. Cl.
*G11B 17/028*    (2006.01)
*G11B 17/03*    (2006.01)

(52) U.S. Cl. ...................... 720/601; 720/608
(58) Field of Classification Search ................ 720/601, 720/603, 605, 612, 615, 608; 369/30.93, 369/30.98

See application file for complete search history.

(56) References Cited

U.S. PATENT DOCUMENTS 5,386,403 A * 1/1995 Morioka et al. .......... 369/30.98

6,760,284 B1 * 7/2004 Kume et al. .............. 369/30.93

FOREIGN PATENT DOCUMENTS

| JP | B-6-75331 | 9/1994 |
| JP | B-7-122951 | 12/1995 |
| JP | 3118952 B | 10/2000 |
| JP | 3264021 B | 12/2001 |

* cited by examiner

*Primary Examiner*—Julie Anne Watko
(74) *Attorney, Agent, or Firm*—Morgan, Lewis & Bockius LLP

(57) ABSTRACT

A disk table rotation supporting structure includes a tray having an inner wall surface that stands upward, a bottom surface provided on an inside, a central axis portion that stands upward on a center portion of the bottom surface, and a receiving portion disposed around the central axis portion, and a disk table having a large circular-ring supporting rib provided downward in neighborhood of the inner wall surface, a central through hole portion opened in a center portion and into which the central axis portion of the tray is inserted, and a small circular-ring rib extended downward from a periphery of the central through hole portion. Only the large circular-ring supporting rib is supported rotatably on the bottom surface of the tray via a lubricating member, and the disk table is rotated in this situation.

6 Claims, 7 Drawing Sheets

Prior Art

DISK TABLE ROTATION SUPPORTING STRUCTURE

BACKGROUND OF THE INVENTION

1. Field of the Invention

The present invention relates to a disk table rotation supporting structure on a tray.

2. Description of the Related Art

A first prior art is shown in FIG. 4, FIG. 5 and FIG. 6. A disk player includes a slide table 103 that is put in and out to slide in the horizontal direction of a housing 101, a rotary disk tray 104 mounted on the slide table 103 and on which a plurality of disk loading portions 104A that can house plural disks therein to align on the same planar surface are provided, a driving unit having a rotating motor 105 for rotating the rotary disk tray 104 to stop it at a predetermined position, a disk playing block 107 housed in the housing 101 to reproduce recording signals of the disk positioned at a playing position of the rotary disk tray 104, and a loading unit 109 for setting the slide table 103 and the disk playing block 107 to a loading position. A chucking head 106 one end of which is held by the slide table 103 is provided over the playing position of the rotary disk tray 104 (for example, see JP-B-6-75331).

However, as shown in FIG. 5, this disk player causes the rotating motor 105 provided on the outside to rotate the rotary disk tray 104.

A second prior art is shown in FIG. 7, FIG. 8, FIGS. 9A and 9B. A disk playing system 201 includes a tray 203 for moving back and forth with respect to a front panel 202 of the disk playing system 201 to install/eject a disk, a turn table 205 fitted rotatably to the tray 203, a plurality of disk holding portions 207 formed on the turn table 205 around the rotating axis of the turn table 205, an annulus rib 229 formed on a back surface of the turn table 205 like a concentric circle of the rotating axis of the turn table 205, notched portions formed on the annulus rib 229, a sensing means (not shown) for sensing the notched portions, a turn table driving means for driving the turn table 205 to turn/transfer the disk 204 being held by the disk holding portion 207 to a disk playing means (not shown), and a controlling means for controlling the driving means. In addition, the notched portions includes a plurality of positioning notches 230 used to stop a plurality of disk holding portions 207 at a playing position of the disk playing means, and a plurality of number sensing notches 231 provided to both sides of the positioning notches 230 symmetrically as a pair respectively to correspond to the numbers assigned to a plurality of disk holding portions 207. When the main body of the system is brought into the playing state, the turn table 205 is rotated to read the number of the disk holding portion. First, a length L3 between the notched portions of both neighboring disk holding portions 207 is sensed by the photo couplers 212 that are opposed to sandwich the annulus rib 229. Then, the number of the number sensing notches 231 on the annulus rib 229 is counted to recognize the position of the disk holding portion 207, the turn table 205 is then rotated in the rotating direction that enable to access quickly the target disk holding portion 207, and then the turn table 205 is rotated until the number sensing notches 231 corresponding to the number of the concerned disk holding portion 207 is counted up. After the number sensing notches 231 corresponding to the number of the target disk holding portion 207 is counted up, a length L1 from the positioning notches 230 to the right or left number sensing notches is sensed and then the turn table 205 is stopped when the positioning notches 230 are sensed. When the turn table 205 is stopped at this positioning notches 230, the disk 204 being held in the target disk holding portion 207 is positioned such that the disk can be loaded correctly on the disk turn table 210 as the playing means (For example, see JP-B-7-122951).

However, the number sensing notches 231 and the positioning notches 230 must be provided in this disk playing system.

A third prior art is shown in FIGS. 10A, 10B and 10C. A tray base fitting mechanism is constructed to provide a sliding surface 301e and a claw portion 301d, which is aligned to the sliding surface 301e, to right and left sides of a tray base 301 and to insert the claw portions 301d of the tray base 301 into visor portions 304c of right and left guides as the fixing portions. A disk 317 can be loaded on the tray base 301 and can be moved in the longitudinal direction between a disk loading/unloading position, at which the disk 317 is protruded from a housing 307, and a disk housing position, at which the disk 317 is housed in the housing 307. When the tray base 301 is positioned at the disk loading/unloading position, the sliding surfaces 301e of the tray base 301 engages with the visor portions 304c of the guide and also only the claw portions 301d of the tray base 301 are seen as the external appearance. In contrast, when the tray base 301 is positioned at the disk housing position, the sliding surfaces 301e of the tray base 301 also engages with the visor portions 304c of the guide (For example, see Japanese Patent No.3118952).

In this tray base fitting mechanism, the sliding surface 301e and the claw portion 301d, which is aligned to the sliding surface 301e, must be provided to the right and left sides of the tray base 301, and also the visor portions 304c of right and left guides as the fixing portions must be provided. Therefore, its configuration of the mechanism becomes complicated.

A fourth prior art is shown in FIG. 11, FIGS. 12A-12B, and FIGS. 13A-13D. In this disk changer, a tray base 401 that is cooperated with a tray table 404 via gears provided to the tray table 404 is provided over the tray table 404 that is pushed out from or housed in a housing 426 by a driving mechanism provided in the housing 426. A rotation shaft 407 is provided over the tray base 401. A rotary tray 402 on which disk receiving portions for loading three sheets of disks are arranged/formed at equal interval is provided. A playing device for playing sequentially the disks loaded on the rotary tray 402 is provided. In addition, a locking gear (not shown) for restricting a movement of the tray table 404, when housed, in the ejecting direction by its rotation, and a tray locking lever 408 for restricting a movement of the tray base 401 in the ejecting direction or the housing direction by its rotation that is interlocked with the locking gear are provided to the tray table (for example, see Japanese Patent No.3264021).

However, as shown in respective drawings, this disk changer is complicated in configuration and the number of parts is very great.

SUMMARY OF THE INVENTION

It is an object of the present invention to make it possible to maintain a rotational speed of a disk table on a tray constant by eliminating variation in the rotational speed and also achieve stabilization of quality by preventing variation in the quality due to variation in parts.

The present invention has been proposed to overcome the above problems, and according to a first aspect of the present invention, there is provided a disk table rotation supporting structure, including: a tray being movable back and forth and having a circular inner wall surface that stands upward, a bottom surface provided on an inside of the inner wall surface, a central axis portion that stands upward on a center portion of the bottom surface, and a receiving portion disposed around the central axis portion; a disk table that can load a plurality of disks thereon and has a large circular-ring supporting rib provided downward in neighborhood of the inner wall surface and in the vicinity of a periphery of the disk table, a central through hole portion opened in a center portion and into which the central axis portion is inserted, and a small circular-ring rib extending downward from a periphery of the central through hole portion around the central axis portion to enter into the receiving portion of the tray, the large circular-ring supporting rib and the small circular-ring rib positioned close to the bottom surface of the tray to support rotatably the disk table on the tray; a cam body having a gear portion; an idler gear rotated by a driving motor via a rotating/driving mechanism and having a gear tooth portion that engages with the gear portion of the cam body when the idler gear is moved to one side to drive a disk playing mechanism that moves vertically a turn table, and that engages with an inward gear tooth portion provided on the large circular-ring supporting rib; and a lubricating member; wherein only the large circular-ring supporting rib is supported rotatably on the bottom surface of the tray via the lubricating member and the disk table is rotated by a rotation of the idler gear via the rotating/driving mechanism in this situation.

According to a second aspect of the invention, there is provided A disk table rotation supporting structure, including: a tray having an inner wall surface that stands upward, a bottom surface provided on an inside of the inner wall surface, a central axis portion that stands upward on a center portion of the bottom surface, and a receiving portion disposed around the central axis portion; a disk table having a large circular-ring supporting rib provided downward in neighborhood of the inner wall surface and in the vicinity of a periphery of the disk table, a central through hole portion opened in a center portion and into which the central axis portion is inserted, and a small circular-ring rib extending downward from a periphery of the central through hole portion, the large circular-ring supporting rib and the small circular-ring rib positioned close to the bottom surface of the tray to support rotatably the disk table on the tray; and a lubricating member; wherein only the large circular-ring supporting rib is supported rotatably on the bottom surface of the tray via the lubricating member and the disk table is rotated by a rotation of the idler gear via the rotating/driving mechanism in this situation.

BRIEF DESCRIPTION OF THE DRAWINGS

FIGS. 10A to 10C are views showing a tray base fitting mechanism in the prior art, wherein FIG. 10A is a perspective view showing an overall disk player, FIG. 10B is a partial sectional view of the tray base fitting mechanism and FIG. 10C is a partial sectional view of another example of the tray base;

FIGS. 12A and 12B are views showing a tray locking lever portion in the disk changer, wherein FIG. 12A is a perspective view of the same and FIG. 12B is a sectional view of the same.

DETAILED DESCRIPTION OF THE PREFERRED EMBODIMENTS

Figure 1:
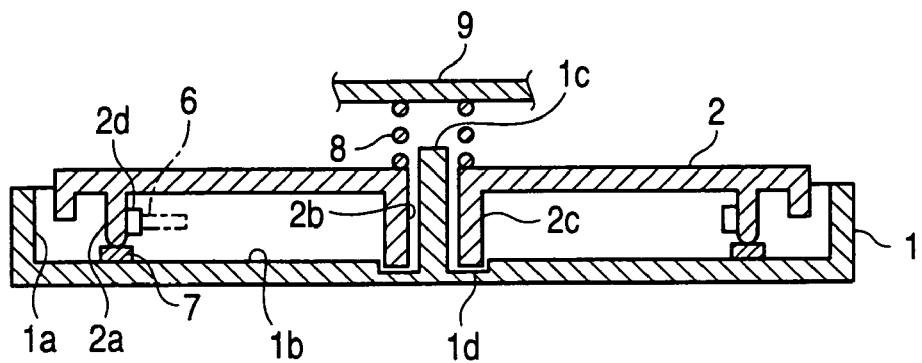
FIG. 1 is a sectional view showing a disk table rotation supporting structure.
Figure 2:
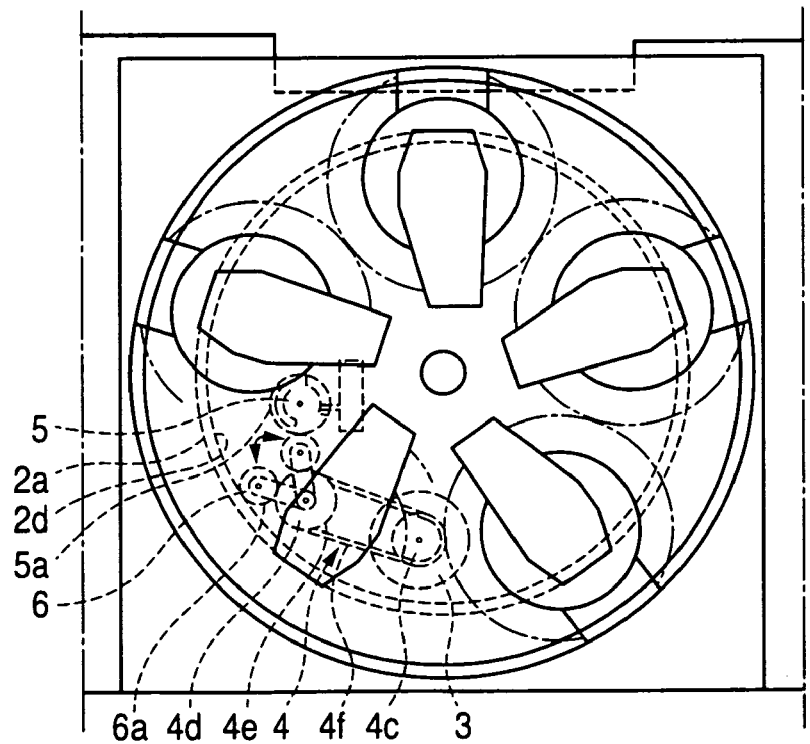
FIG. 2 is a partial plan view of a disk unit having the disk table rotation supporting structure.

An embodiment of a disk table rotation supporting structure according to the present invention will be described with reference to the accompanying drawings. FIG. 1 is a sectional view showing a disk table rotation supporting structure. FIG. 2 is a partial plan view of a disk unit having the disk table rotation supporting structure.

As shown in FIG. 1, a disk table rotation supporting structure of the present embodiment includes a tray 1 that can be moved back and forth and has a circular inner wall surface 1$a$ that stands upward, a bottom surface 1$b$ provided on the inside of the inner wall surface, a central axis portion 1$c$ that stands upward on the center portion of the bottom surface 1$b$, a receiving portion 1$d$ having an annular recess shape and disposed around the central axis portion 1$c$, and a disk table 2 that can load a plurality of disks (not shown) thereon and has a large circular-ring supporting rib 2$a$ provided downward in neighborhood of the inner wall surface 1$a$ of the tray 1, a central through hole portion 2$b$ opened in the center portion and into which the central axis portion 1$c$ of the tray 1 is inserted, and a small circular-ring rib 2$c$ extended downward from a periphery of the central through hole portion 2$b$ around the central axis portion 1$c$ to enter into the receiving portion 1$d$ of the tray 1. The large circular-ring supporting rib 2$a$ and the small circular-ring rib 2$c$ of the disk table 2 are positioned close to the bottom surface of the tray 1 to support rotatably the disk table 2 on the tray 1.

As shown in FIG. 2, when rotated by a driving motor 3 via a rotating/driving mechanism 4 to move to one side, a gear tooth portion 6$a$ of an idler gear 6 engages with an inward gear tooth portion 2$d$ provided to the large circular-ring supporting rib 2$a$ that is provided in the vicinity of the periphery of the disk table 2. When rotated by a driving motor 3 via a rotating/driving mechanism 4 to move to the other side, the idler gear 6 engages with a gear portion 5$a$ provided to a cam body 5. The cam body 5 drives a disk playing mechanism that moves vertically a turn table (not shown).

As shown in FIG. 2, the rotating/driving mechanism 4 is constructed by the driving motor 3, a pulley 4$c$ provided to a shaft portion of the driving motor 3, a gear 4$d$ for driving the idler gear 6, a pulley 4$e$ provided to a shaft portion of the gear 4$d$, and a belt 4$f$ stretched between both pulleys 4$c$, 4$e$.

Figure 3A:
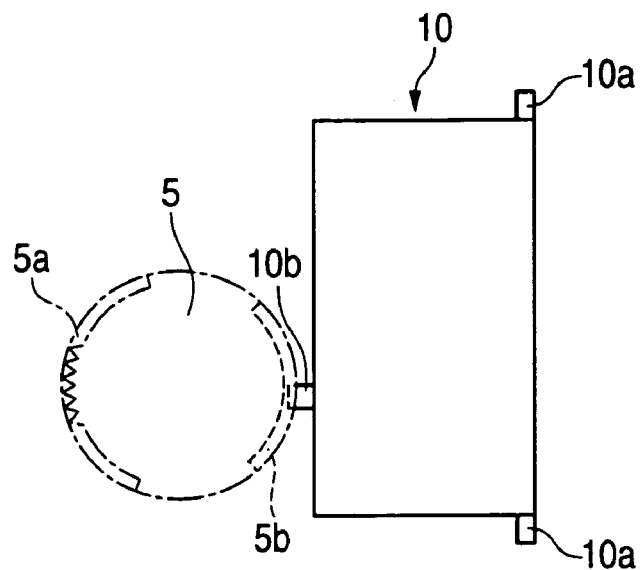
FIG. 3A is a schematic plan view showing a cam body and a movable member engaged with the cam body.
Figure 3B:
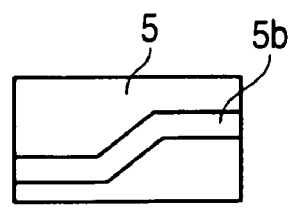
FIG. 3B is a side view showing a cam groove of the cam body.
Figure 4:
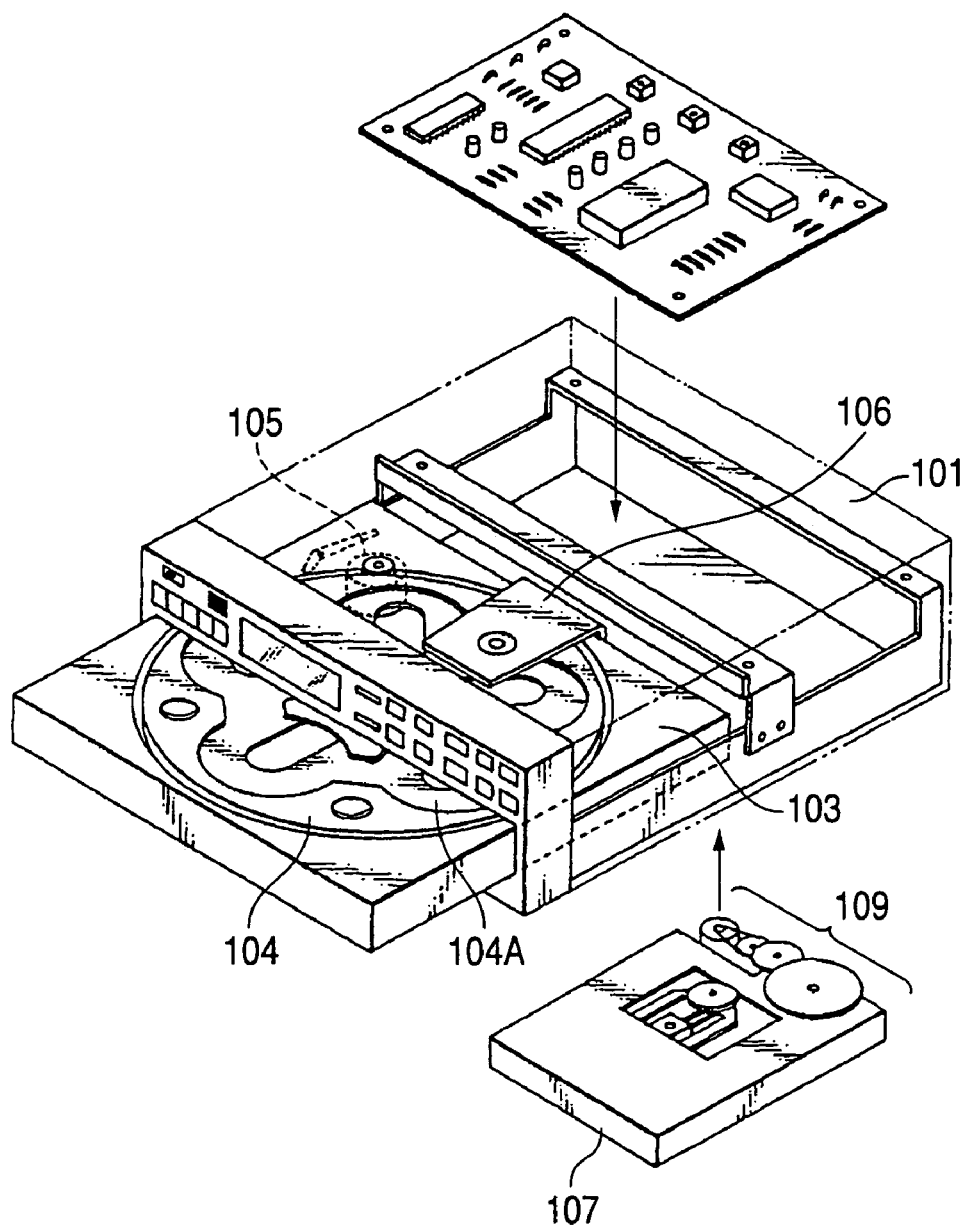
FIG. 4 is an exploded perspective view showing a disk player in the prior art.
Figure 5:
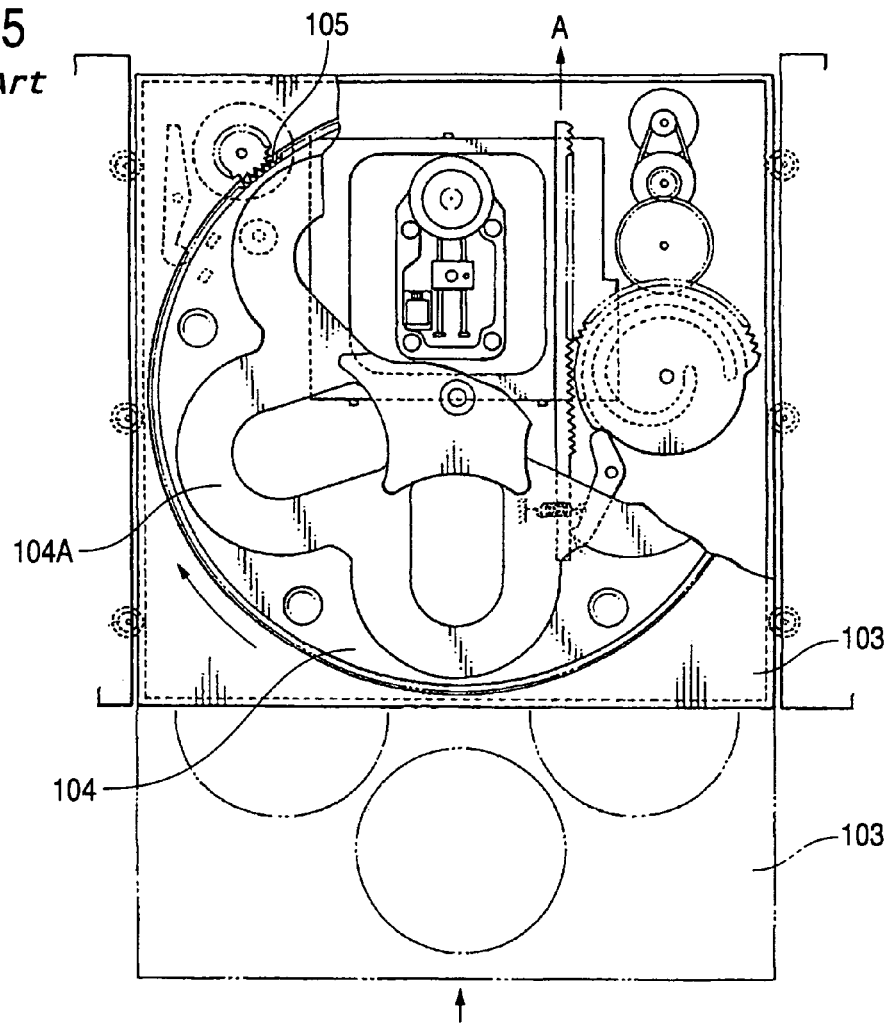
FIG. 5 is a plan view showing a mechanism for bringing a slide table in the disk player into the loading state.
Figure 6:
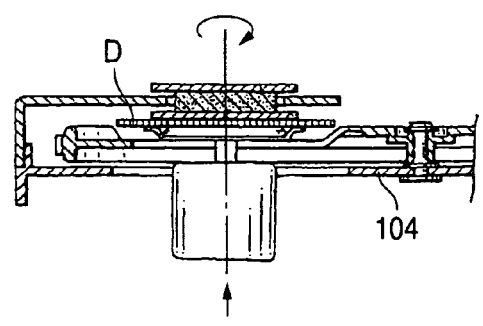
FIG. 6 is a sectional view of a chucking head of the disk player.
Figure 7:
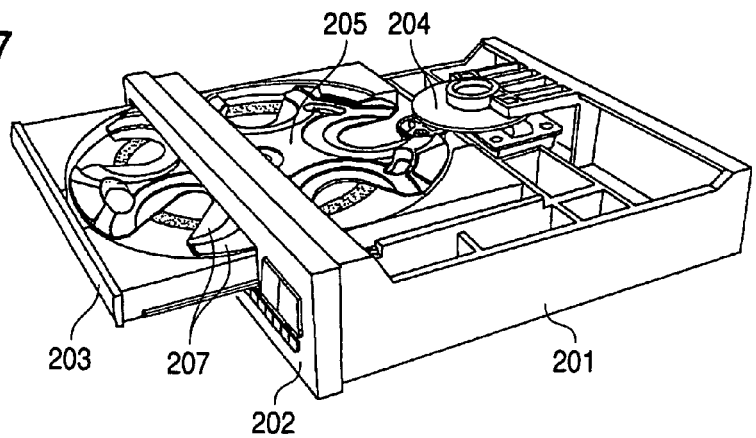
FIG. 7 is a perspective view of a disk playing system in the prior art.
Figure 8:
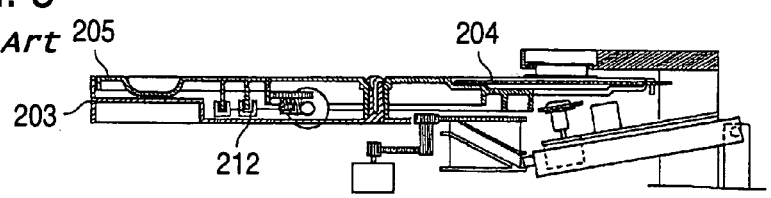
FIG. 8 is a schematic sectional view of the system.
Figure 9A:
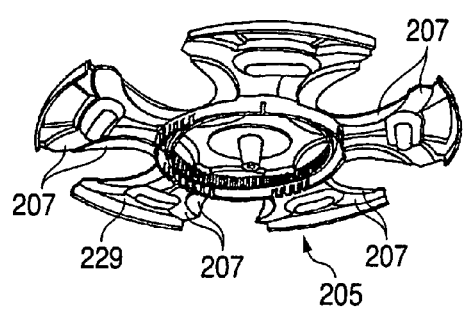
FIG. 9A is a perspective view of a turn table viewed from the lower surface side.
Figure 9B:
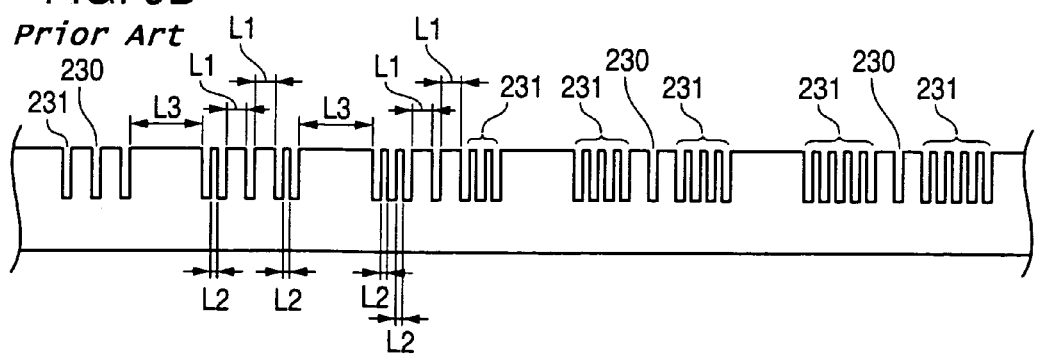
FIG. 9B is a partial pattern.
Figure 10A:
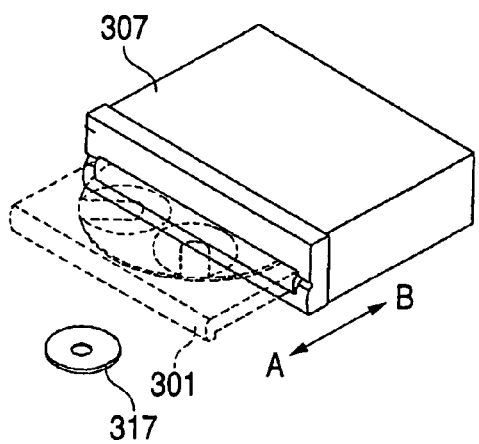
Figure 10B:
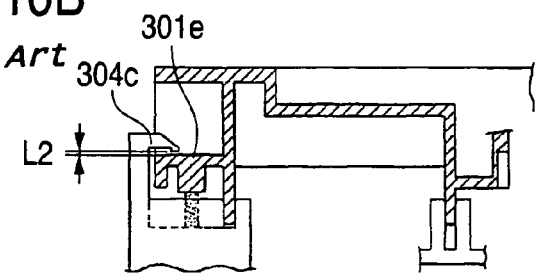
Figure 10C:
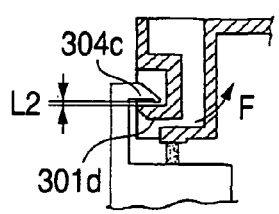
Figure 11:
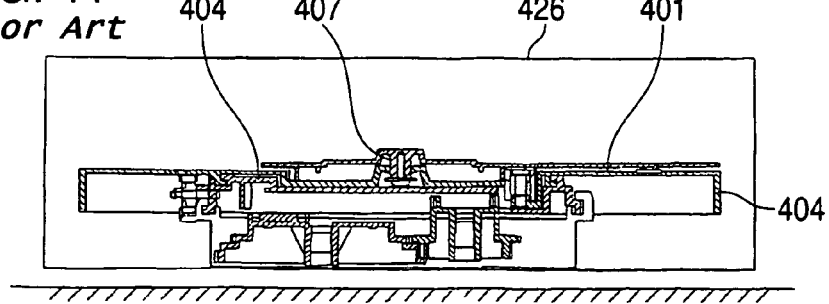
FIG. 11 is a front sectional view of a tray portion and a mechanical base in a disk changer in the prior art.
Figure 12A:
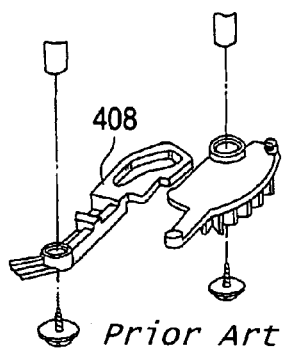
Figure 12B:
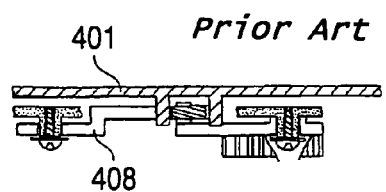
Figure 13A:
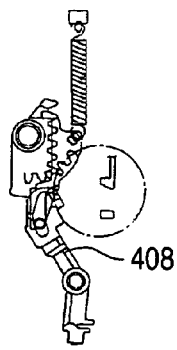
FIGS. 13A to 13D are plan views showing an operational relationship of the tray locking lever in the disk changer.
Figure 13B:
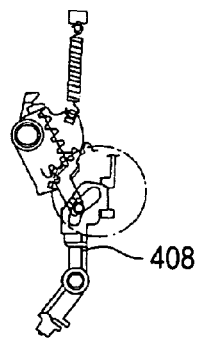
Figure 13C:
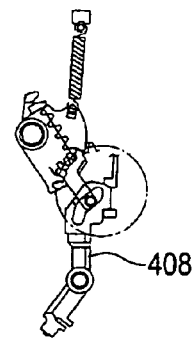
Figure 13D:
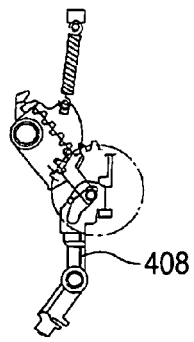

As shown in FIGS. 3A and 3B, the cam body 5 has on its one side surface that is opposite to the surface having the gear portion 5aa cam groove 5b. A projection 10b disposed on a movable member 10 having a rotational shaft 10a slidably engages with the cam groove 5b. When the cam body 5 is rotated via the idler gear 6, the movable member 10 swings about the rotational shaft 10a to thereby vertically move the turn table.

As shown in FIG. 1, only the large circular-ring supporting rib 2a provided in the vicinity of the periphery of the disk table 2 is supported rotatably on the bottom surface 1b of the tray 1 via a lubricating member 7. The small circular-ring rib 2c is always floated over the bottom surface 1b. Therefore, the disk table 2 is rotated by the rotation of the idler gear 6 via the rotating/driving mechanism 4, which is driven by the driving motor 3, in the circumferential direction in the situation that only the large circular-ring supporting rib 2a is supported by the lubricating member 7 provided on the bottom surface 1b of the tray 1.

The tip of the large circular-ring supporting rib 2a is formed into a circular surface, and is brought into line contact with the lubricating member 7. The lubricating member 7 may be made of fluorocarbon resin. On the other hand, a gap of 0.5 mm to 1.0 mm is defined between the receiving portion 1d of the tray 1 and the tip of the small circular-ring rib 2c.

In FIG. 1, a reference 8 denotes a spring for pushing downward the disk table 2. This spring is fitted to a lower surface of an upper wall 9 of the disk system main body.

According to the present embodiment, the small circular-ring rib 2c is brought into the state such that the small circular-ring rib is always floated over the bottom surface 1b, and only the large circular-ring supporting rib 2a provided in the vicinity of the periphery of the disk table 2 is supported on the bottom surface 1b of the tray 1 via the lubricating member 7. As a result, it is possible to maintain a rotational speed of the disk table 2 on the tray 1 constant by eliminating variation in the rotational speed and also achieve stabilization of quality by preventing variation in the quality caused by variation in parts.

As described above, the first aspect of the invention provides a disk table rotation supporting structure, including: a tray being movable back and forth and having a circular inner wall surface that stands upward, a bottom surface provided on an inside of the inner wall surface, a central axis portion that stands upward on a center portion of the bottom surface, and a receiving portion disposed around the central axis portion; a disk table that can load a plurality of disks thereon and has a large circular-ring supporting rib provided downward in neighborhood of the inner wall surface and in the vicinity of a periphery of the disk table, a central through hole portion opened in a center portion and into which the central axis portion is inserted, and a small circular-ring rib extending downward from a periphery of the central through hole portion around the central axis portion to enter into the receiving portion of the tray, the large circular-ring supporting rib and the small circular-ring rib positioned close to the bottom surface of the tray to support rotatably the disk table on the tray; a cam body having a gear portion; an idler gear rotated by a driving motor via a rotating/driving mechanism and having a gear tooth portion that engages with the gear portion of the cam body when the idler gear is moved to one side to drive a disk playing mechanism that moves vertically a turn table, and that engages with an inward gear tooth portion provided on the large circular-ring supporting rib; and a lubricating member; wherein only the large circular-ring supporting rib is supported rotatably on the bottom surface of the tray via the lubricating member and the disk table is rotated by a rotation of the idler gear via the rotating/driving mechanism in this situation. Therefore, advantages described in the following can be achieved.

That is, the small circular-ring rib is always brought into the floated state over the bottom surface, and only the large circular-ring supporting rib provided in the vicinity of the periphery of the disk table is supported on the bottom surface of the tray via the lubricating member. Therefore, it is feasible to maintain the rotational speed of the disk table on the tray constant by eliminating variation in the rotational speed and also achieve the stabilization of the quality by preventing variation in the quality due to variation in parts.

Also, the second aspect of the invention provides a disk table rotation supporting structure, including: a tray having an inner wall surface that stands upward, a bottom surface provided on an inside of the inner wall surface, a central axis portion that stands upward on a center portion of the bottom surface, and a receiving portion disposed around the central axis portion; a disk table having a large circular-ring supporting rib provided downward in neighborhood of the inner wall surface and in the vicinity of a periphery of the disk table, a central through hole portion opened in a center portion and into which the central axis portion is inserted, and a small circular-ring rib extending downward from a periphery of the central through hole portion, the large circular-ring supporting rib and the small circular-ring rib positioned close to the bottom surface of the tray to support rotatably the disk table on the tray; and a lubricating member; wherein only the large circular-ring supporting rib is supported rotatably on the bottom surface of the tray via the lubricating member and the disk table is rotated by a rotation of the idler gear via the rotating/driving mechanism in this situation. Therefore, advantages described in the following can be achieved.

That is, only the large circular-ring supporting rib provided in the vicinity of the periphery of the disk table is supported on the bottom surface of the tray via the lubricating member. Therefore, it is feasible to maintain the rotational speed of the disk table on the tray constant by eliminating variation in the rotational speed and also achieve the stabilization of the quality by preventing variation in the quality due to variation in parts.

What is claimed is:

1. A disk table rotation supporting structure, comprising:
a tray being movable back and forth and having a circular inner wall surface that stands upward, a bottom surface provided on an inside of the inner wall surface, a central axis portion that stands upward on a center portion of the bottom surface, and a receiving portion disposed around the central axis portion;
a disk table that can load a plurality of disks thereon and has a large circular-ring supporting rib provided downward in neighborhood of the inner wall surface and in the vicinity of a periphery of the disk table, a central through hole portion opened in a center portion and into which the central axis portion is inserted, and a small circular-ring rib extending downward from a periphery of the central through hole portion around the central axis portion to enter into the receiving portion of the tray, the large circular-ring supporting rib and the small circular-ring rib positioned close to the bottom surface of the tray to support rotatably the disk table on the tray;
a cam body having a gear portion;

an idler gear rotated by a driving motor via a rotating/driving mechanism and having a gear tooth portion that engages with the gear portion of the cam body when the idler gear is moved to one side to drive a disk playing mechanism that moves vertically a turn table, and that engages with an inward gear tooth portion provided on the large circular-ring supporting rib; and a lubricating member;

wherein only the large circular-ring supporting rib is supported rotatably on the bottom surface of the tray via the lubricating member and the disk table is rotated by a rotation of the idler gear via the rotating/driving mechanism in this situation.

2. The disk table rotation supporting structure of claim 1, wherein the rotating/driving mechanism comprises the motor, a first pulley associated with a shaft portion of the driving motor, a driving gear for driving the idler gear, a second pulley associated with a shaft portion of the driving gear, and a belt between the first and second pulleys.

3. The disk table rotation supporting structure of claim 1, wherein the cam body has a cam groove on a side surface opposite to a surface having the gear portion.

4. The disk table rotation supporting structure of claim 3, further comprising a movable member having a projection and a rotational shaft, wherein the projection slidably engages the cam groove such that when the cam body is rotated, the movable member swings about the rotational shaft to vertically move the turn table.

5. The disk table rotation supporting structure of claim 1, wherein the lubricating member is made of fluorocarbon resin.

6. The disk table rotation supporting structure of claim 1, further comprising a spring for pushing the disk table in a direction parallel to the central through hole.

* * * * *